United States Patent Office 2,792,676
Patented May 21, 1957

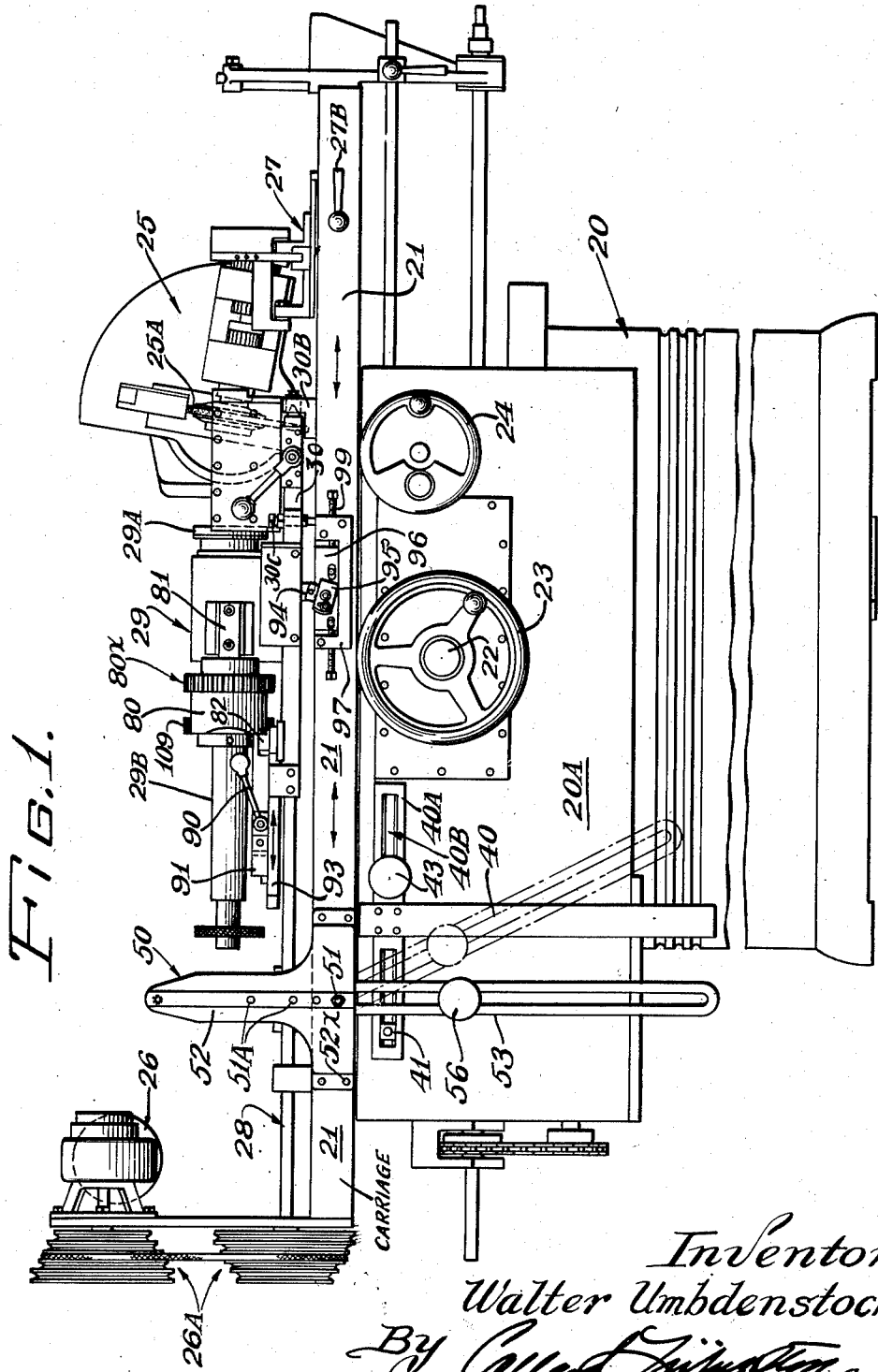

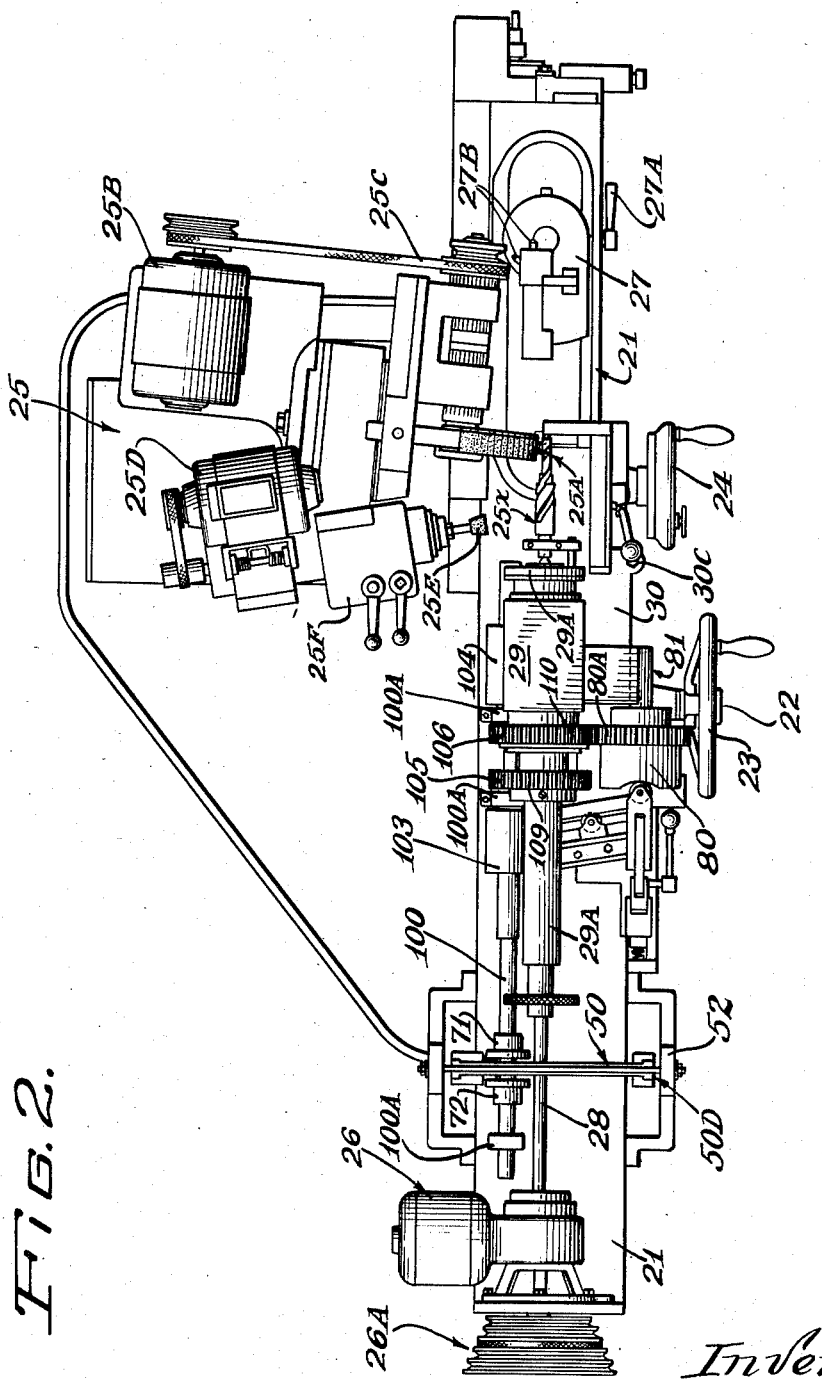

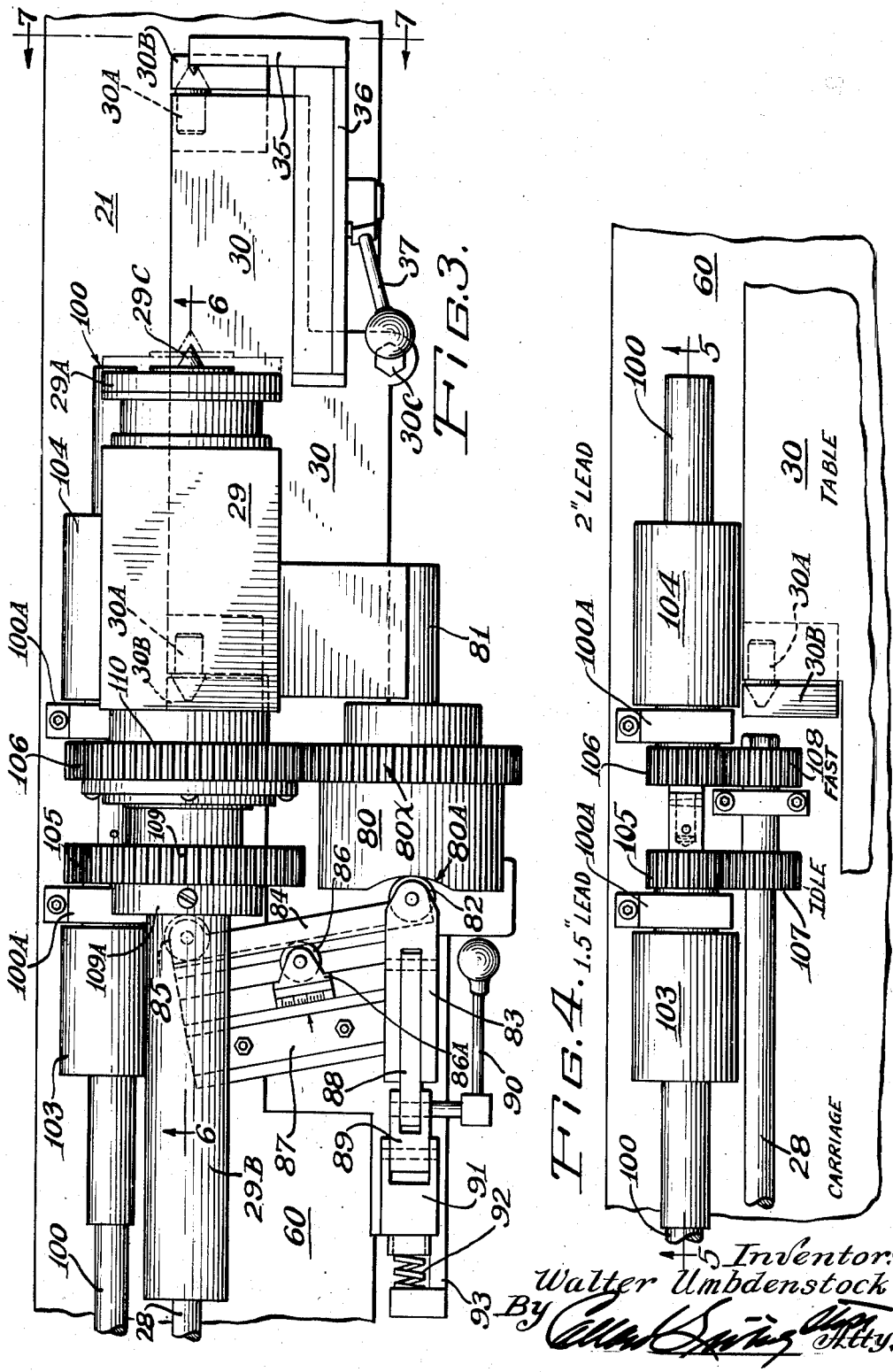

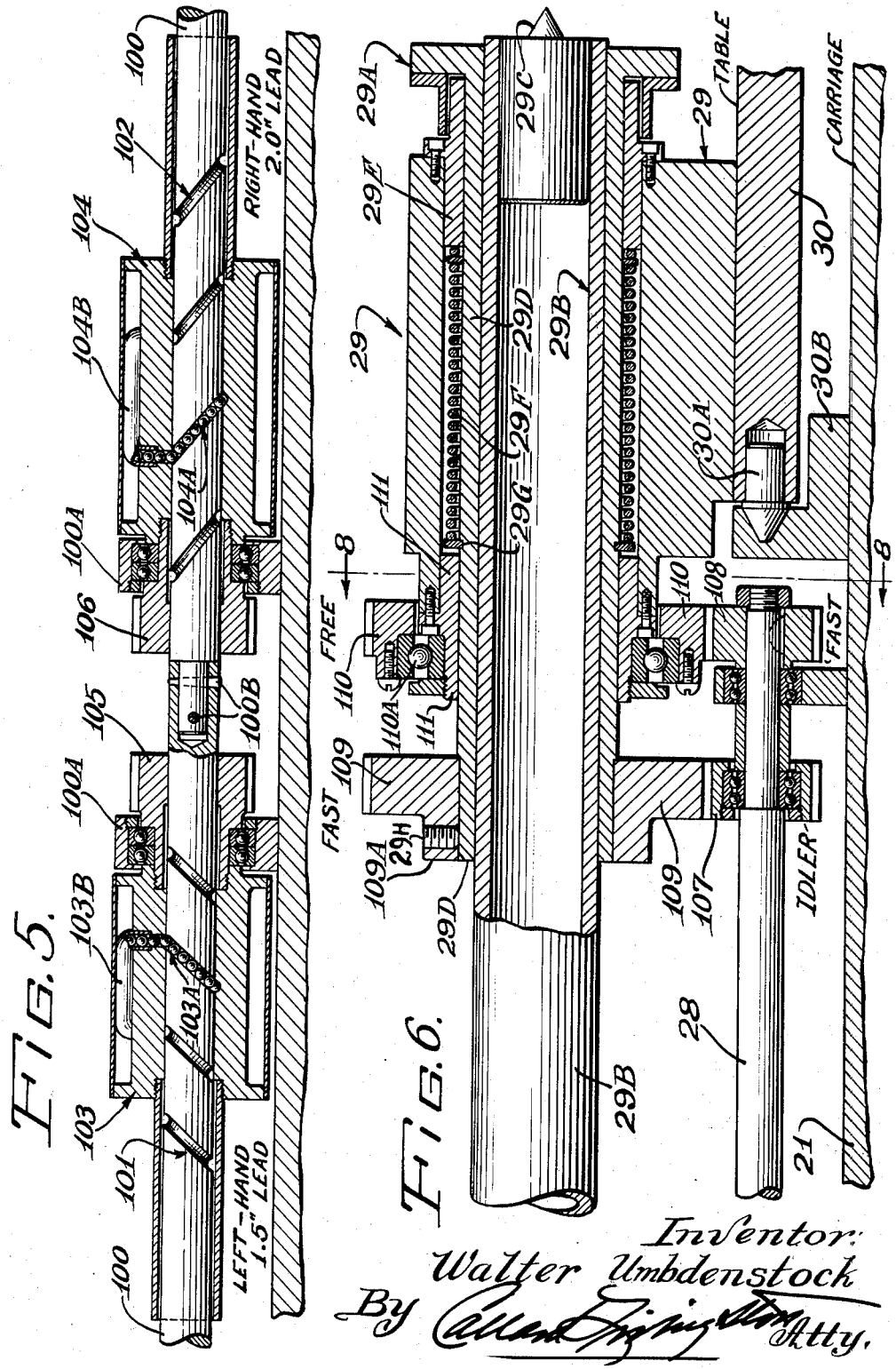

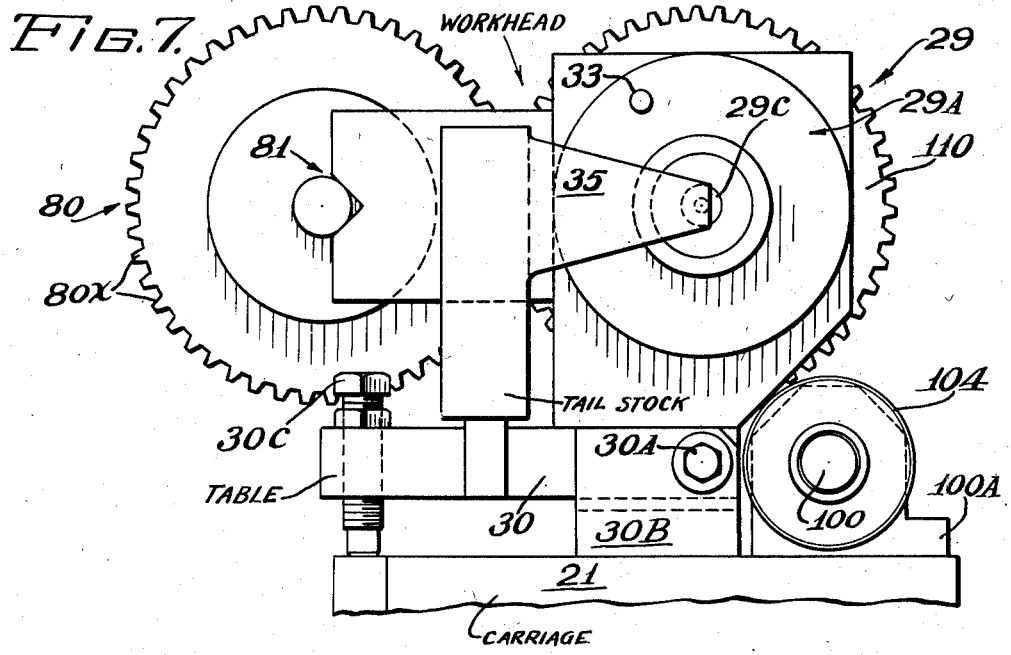
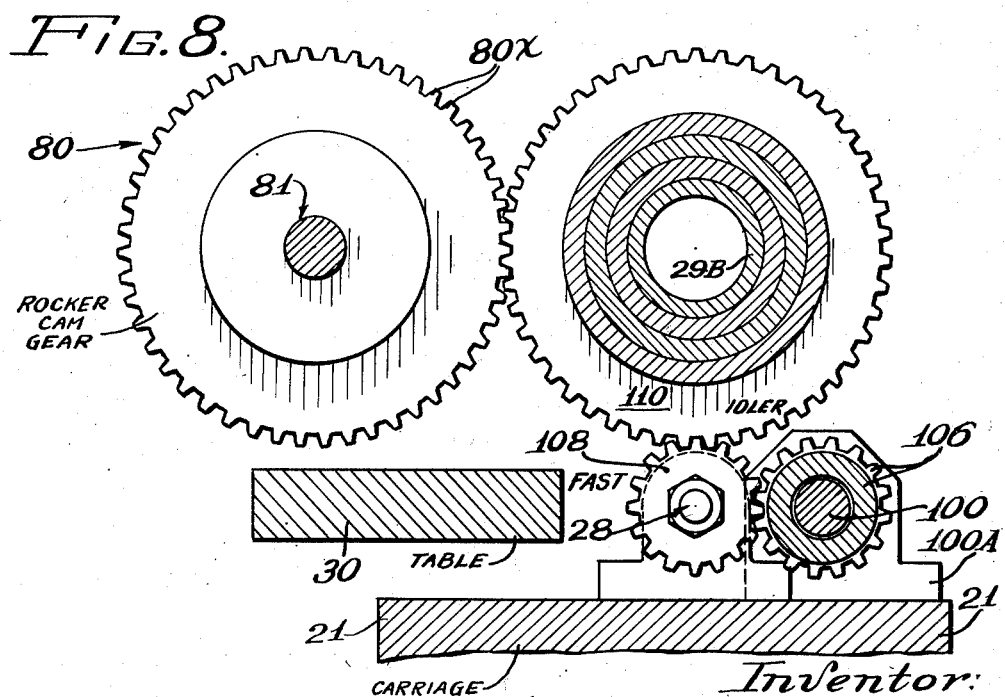

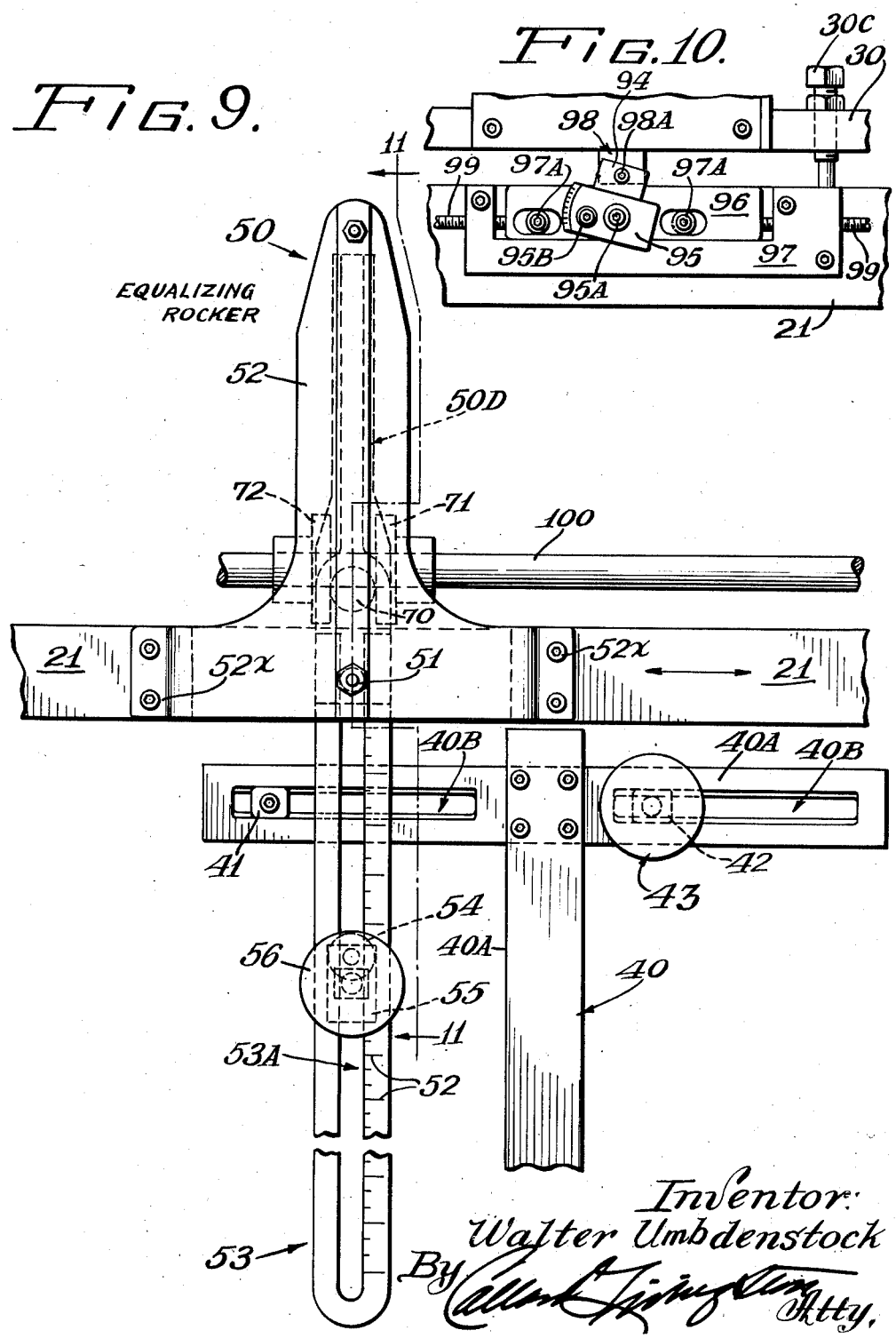

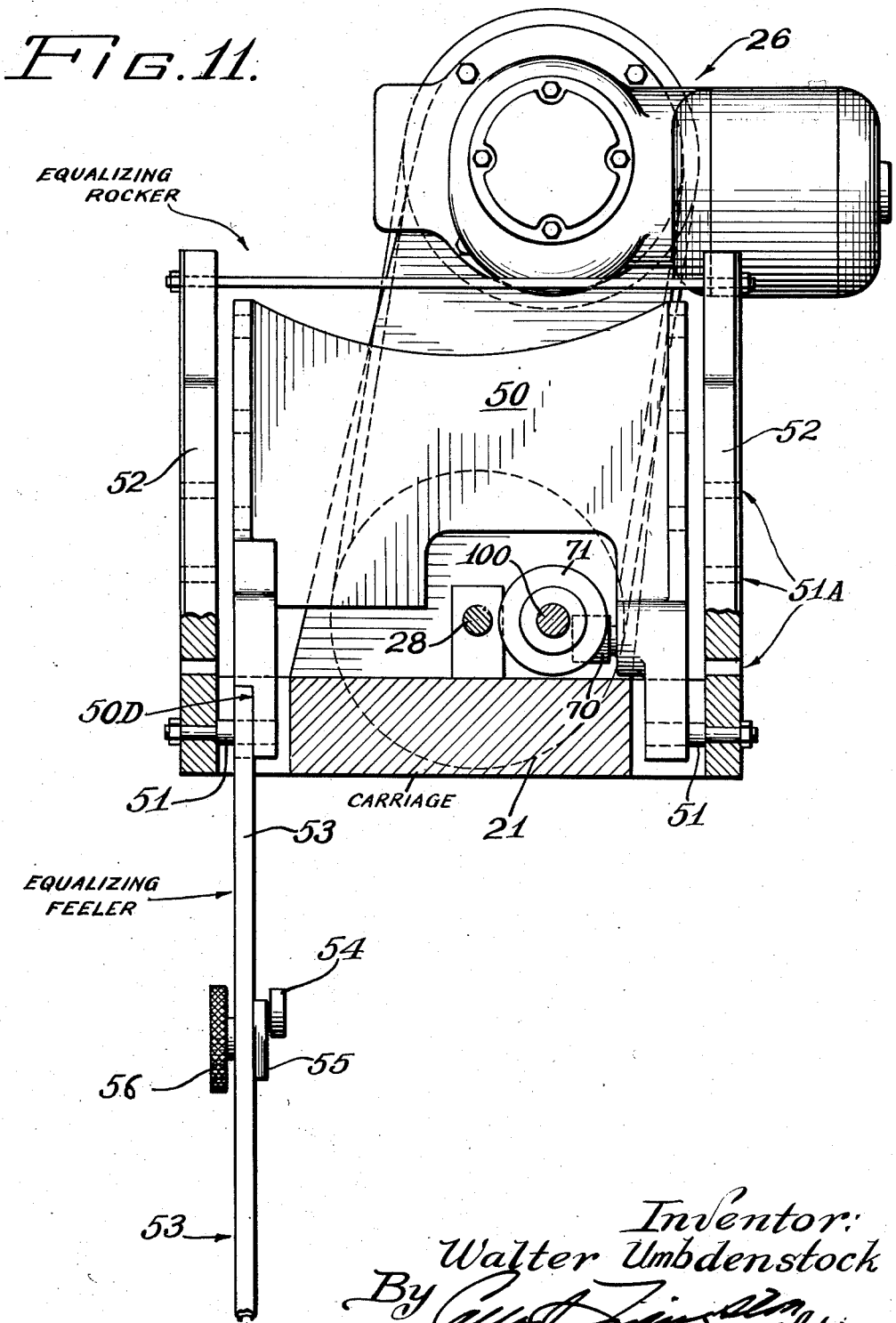

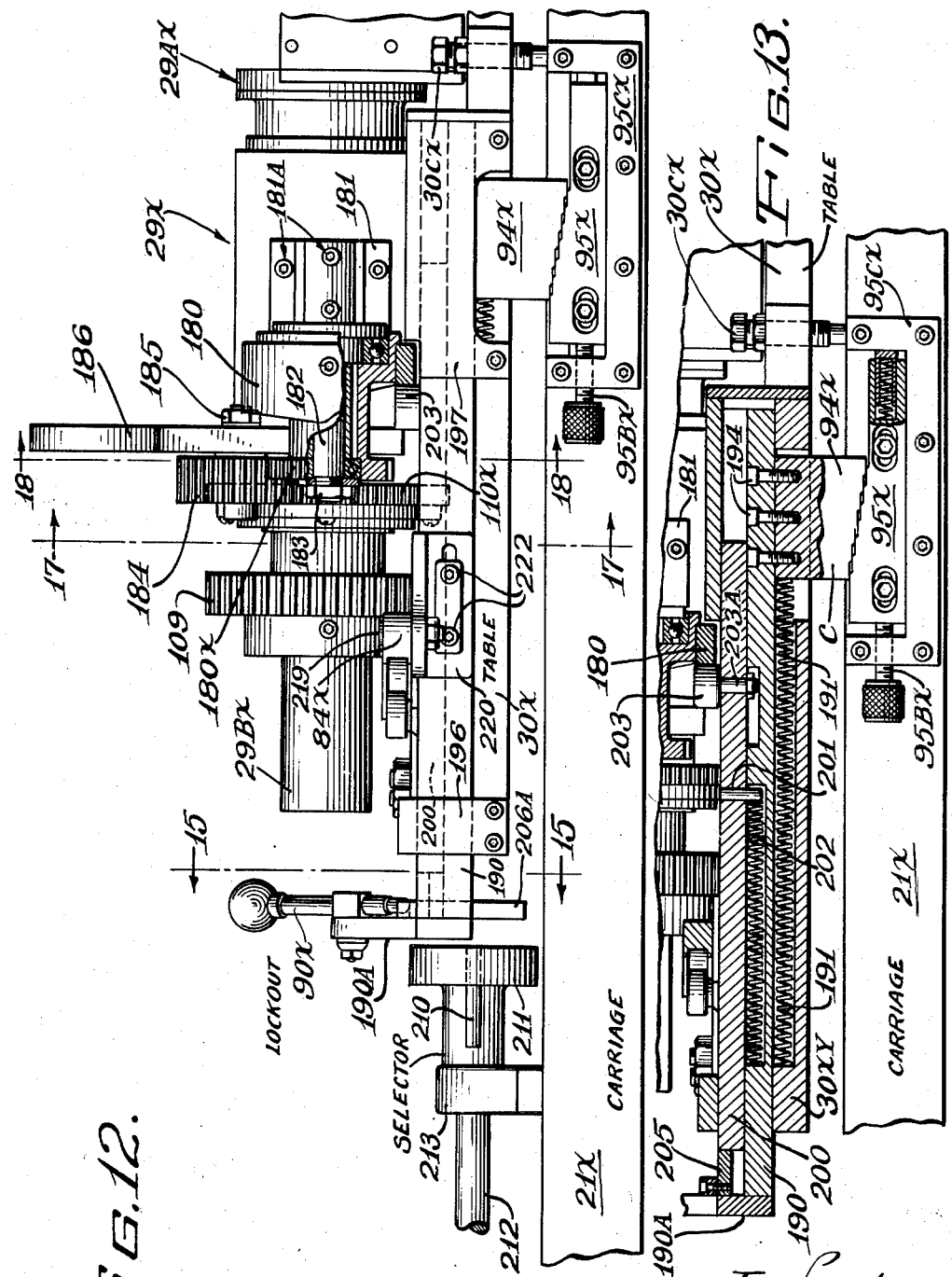

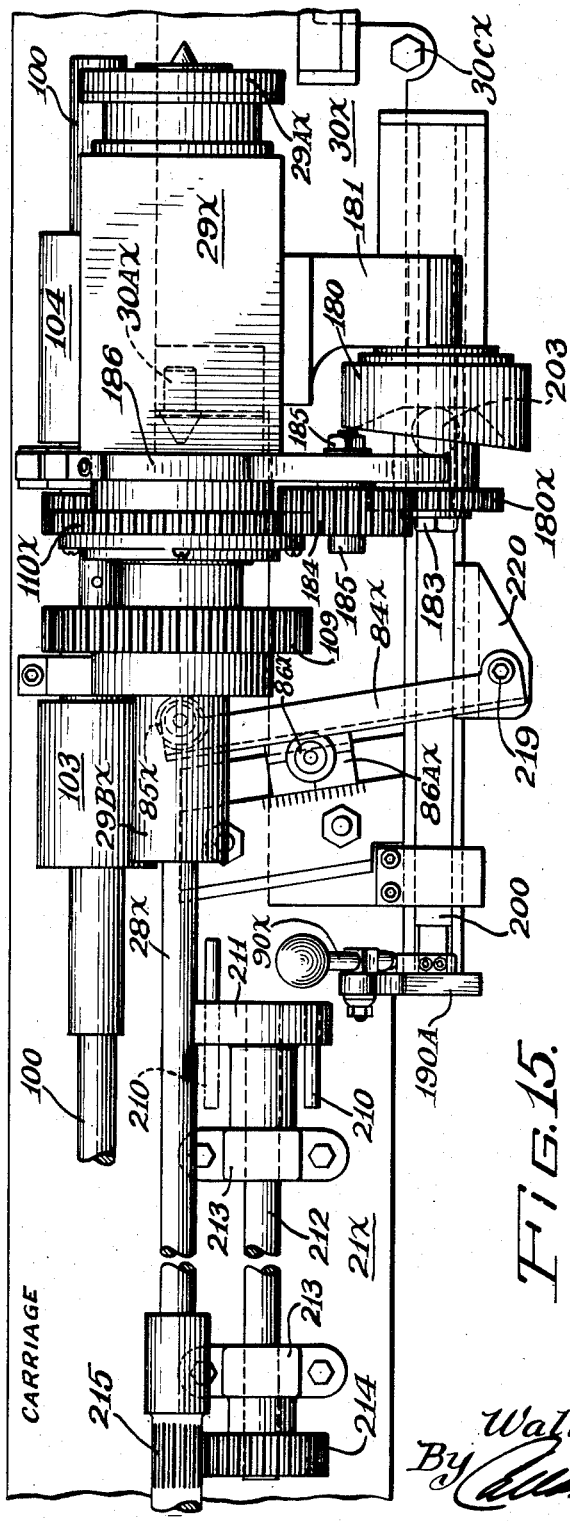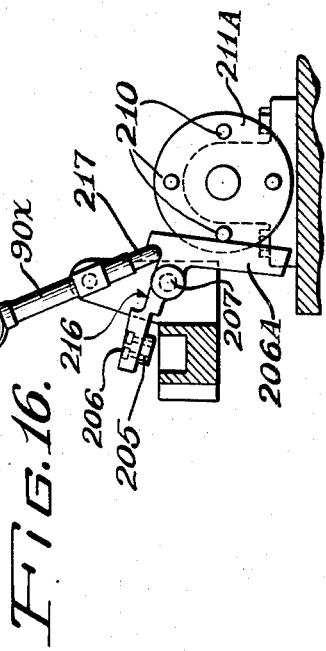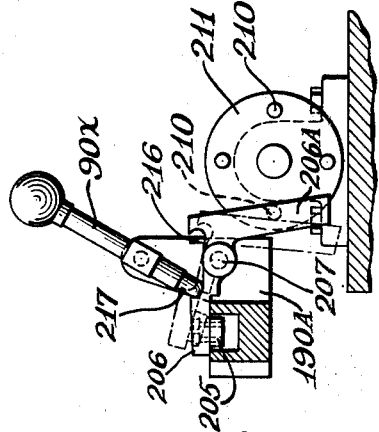

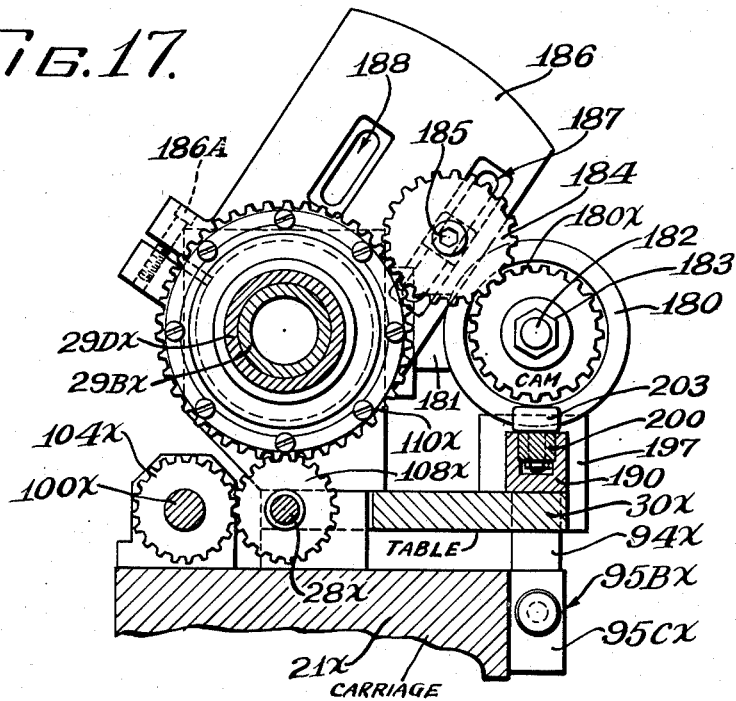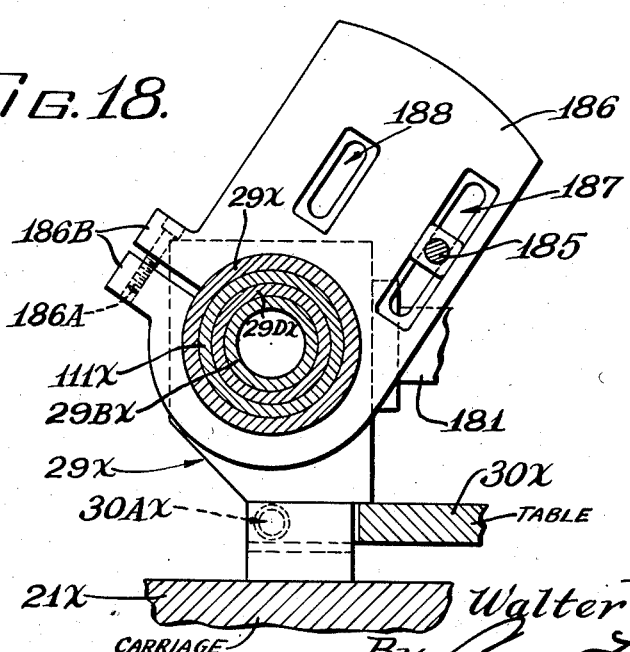

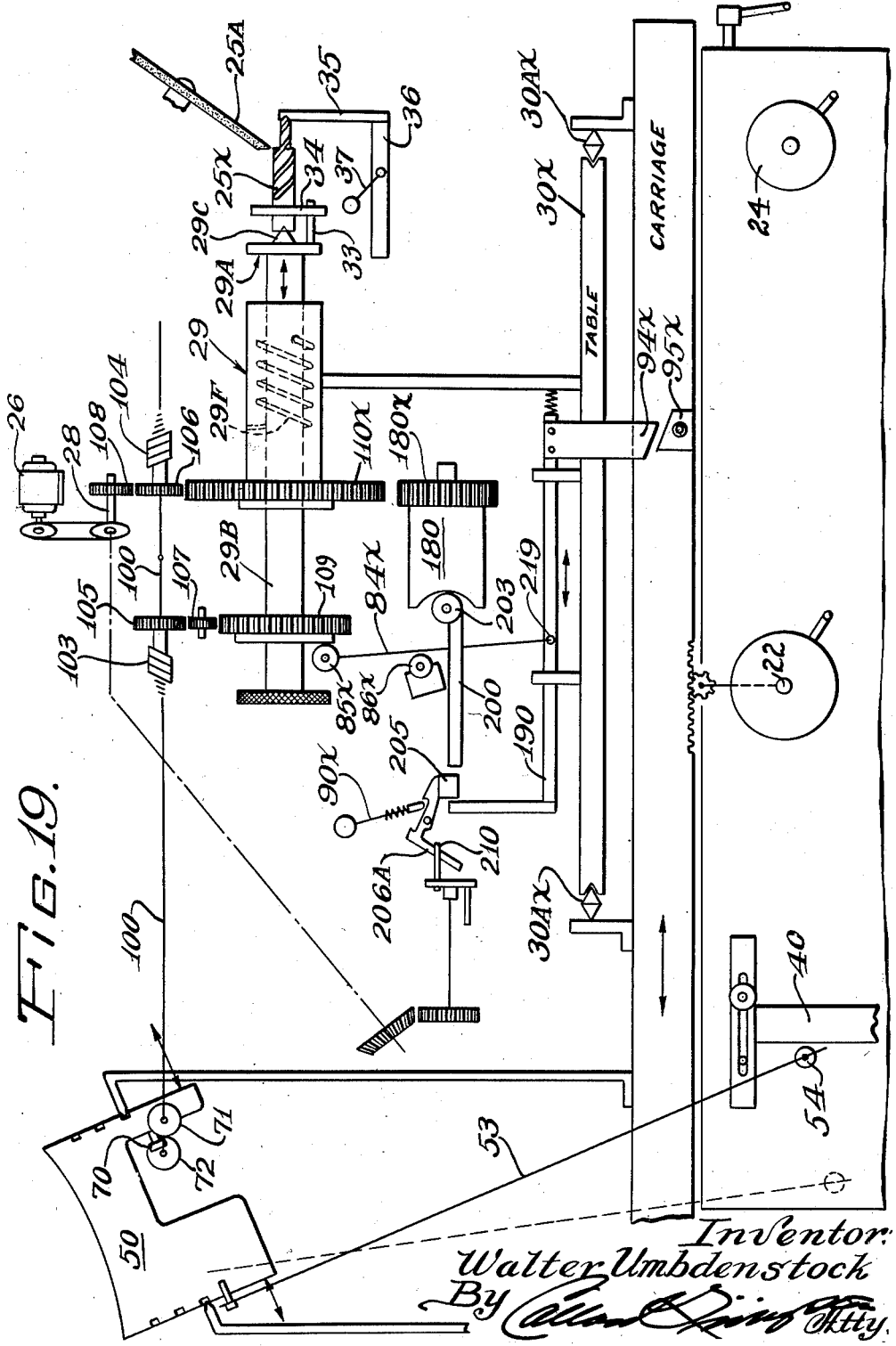

2,792,676

SPIRAL GRINDING MACHINE

Walter Umbdenstock, Chicago, Ill., assignor of one-half to Charles T. Breitenstein, Chicago, Ill.

Application May 25, 1953, Serial No. 357,009

20 Claims. (Cl. 51—95)

This invention pertains to automatic grinding machines of the type adapted to the manufacture, dressing, and reconditioning of boring tools, especially those involving a spiral lead, such as twist drills, step drills, certain types of reamers, and cutters, milling bits, and the like.

One of the principal objects of the invention is the provision of an improved machine of this type having a spiral feed mechanism of unique structural character and exceptional accuracy.

Another object is the provision of a sensitive differential screw mechanism and interdrive for a rotary chuck for driving and over-driving the latter under control of a loading factor to be applied to the screw system from a control source.

A further object is the provision of a loading or equalizing means for deriving an adjustable loading factor from the travel of a traverse carriage and applying said factor to the screw system so as to precisely correlate the angular speed of the chuck to the linear travel of the carriage.

Still another object is the provision of a selective lock-out mechanism cooperable with certain motion-compounding mechanisms actuated under control of the differential screw means and functioning to confine the grinding operations to predetermined portions (e. g. certain flutes) of the drill blank.

Yet another object is the provision of an improved motion-compounding mechanism cooperable with the lock-out mechanism for imparting a lateral oscillation as well as a longitudinal reciprocation to the work chuck simultaneously with the spiral-motion displacement under control of the differential screw system.

A still further object is the provision of improvements for simplifying the construction, operation, and automatic control of spiral grinding machines of the type disclosed in U. S. Patent No. 2,479,281 with particular respect to the objects recited above.

Still further aspects of novelty and utility characteristic of the invention relate to details of the construction and operation of the machine described hereinafter in view of the annexed drawings, in which:

Fig. 1 is a front elevation of the new grinding machine;

Fig. 2 is a top plan view of the same;

Fig. 3 is a fragmentary top plan view, to enlarged scale, of the workhead and chuck, showing parts of the differential screw and gear means and the lateral rocking and lock-out means;

Fig. 4 is a fragmentary top plan detail of parts of the differential worm and gear means, which are also partially seen in Fig. 3;

Fig. 5 is a vertical sectional detail through the differential worm or screw means, taken in the direction of lines 5—5 of Fig. 4;

Fig. 6 is a horizontal sectional detail through the workhead table and chuck, as seen in the direction of lines 6—6 of Fig. 3;

Fig. 7 is an endwise view, in elevation, of the workhead and chuck, as seen in the direction of lines 7—7 of Fig. 3;

Fig. 8 is a transverse sectional detail through the workhead and chuck, looking in the direction of lines 8—8 of Fig. 6;

Fig. 9 is an elevational detail, to enlarged scale, of the equalizing rocker and loading feeler, seen also in Fig. 1;

Fig. 10 is an enlarged elevational detail of one form of the adjustable cam-riser means for the rocking workhead table;

Fig. 11 is a sectional view taken crosswise through the main carriage, showing parts of the equalizing rocker in elevation, as seen in the direction of lines 11—11 of Fig. 10;

Fig. 12 is a fragmentary elevational detail, to enlarged scale, of a modified form of workhead equipped with flute-selecting lock-out mechanism and changeable gear means;

Fig. 13 is a vertical sectional detail through the lock-out slide mechanism shown in Fig. 12;

Fig. 14 is a top plan view of the selective lock-out mechanism shown in Fig. 12;

Fig. 15 is a cross-sectional detail, with parts shown in elevation, of the flute-selecting lock-out-control set in selecting position, as seen in the direction of lines 15—15 of Fig. 12;

Fig. 16 shows the lock-out control of Fig. 15 tripped out in non-selective operation;

Fig. 17 is a cross-sectional detail of the change-gear mechanism for the modified workhead, with parts shown in elevation, as seen in the direction of lines 17—17 of Fig. 12;

Fig. 18 is a cross-sectional detail of the change-gear clamp plate, taken along lines 18—18 of Fig. 12;

Fig. 19 is a functional diagram for illustrating the operation of the differential screw system, the flute-selecting lock-out, and associated motion-compounding mechanism.

A summary of operation with reference to Fig. 19 will be found hereinafter.

It is emphasized at the outset that most of the automatic grinding operations which the new machine is required to perform involve the production of a complex motion in the work piece or drill blank during engagement of the latter with the grinding means.

Usually, each complete cycle or pattern of this complex motion is achieved by compounding at least three, and frequently four, constituent displacements occurring more or less simultaneously or in a certain close sequence, depending upon the type of grinding pattern involved.

For example, the spiral displacement of a drill blank relative to a grinding tool is produced as a resultant of combining linear and angular motions, as by rotating the blank while simultaneously travelling it in the direction of its length past the grinder.

To such a spiral motion there is generally to be added a rapid, lateral, translation or oscillation to thrust the drill blank sidewise against the grinding wheel and quickly retract it.

If the drill is to be radially relieved, the sidewise or lateral translation is a rocking motion having a certain radial relation to the chuck and the center of the grinding wheel; and to this will probably be added still another component of motion in the nature of a quick, short-amplitude displacement of the chuck to reciprocate the drill blank in the direction of its length.

Thus, the constituent movements usually required are these, namely: linear displacement (i. e. a lengthwise travel); rotary (angular) displacement; lateral (sidewise) displacement; and commonly, a lengthwise reciprocation concurring with the linear travel and/or the lateral displacements.

In the present machine, the several movements to be compounded are produced, speaking generally, by having the chuck means mounted to reciprocate through a short stroke in the workhead, thus providing for the short-amplitude linear reciprocation; and further, by having the entire workhead mounted on a rockable table on the traverse carriage, thereby providing for the lateral displacement; and, finally, by travelling the rocking table, with its workhead and chuck, as a unit with the carriage, and at the same time rotating the chuck, thus compounding the angular and linear elements necessary to produce a spiral lead, along with the oscillatory and reciprocatory effects.

While the spiral grinding machine disclosed in the aforesaid Patent No. 2,479,281 is also capable of producing complex displacements of the type alluded to above, it does so by mechanisms differing both in construction and operation from those revealed herein, especially with respect to the new means for producing and governing the spiral lead; as well as the differential interdrive and equalizing means; the selective lockout means; and other instrumentalities and subcombinations of the new machine now to be described in detail.

*Main carriage—Linear travel*

As viewed from the operation's position in Fig. 1, the machine includes a heavy base portion 20 upon which travels a main traverse carriage 21, which is manually movable back and forth by manipulation of handwheel 23, and which is also motor-driven through a standard lead-screw means (not detailed) under control of a feed nut 22, there being additionally provided the usual cross-feed handwheel 24 for moving one or another type of working tool (e. g. a cutter or grinder) laterally into and out of position across the bed for engagement by the chucked drill blank or other work piece. The construction and operation of the foregoing instrumentalities are conventional and well-understood in the art pertaining to lathe-type machine tools, and are therefore not described in further detail herein.

In the illustrative embodiment, the working tool is a grinding head, generally indicated at 25 in Fig. 1, and shown to better advantage in Fig. 2 to include a large grinding wheel 25A driven by motor 25B through belt means 25C, as well as a smaller abrasive wheel 25E driven by another motor 25D through a conversion gear and control unit 25F. Either of the grinders 25A or 25E may be swung into the working position occupied by the wheel 25A, and, when thus positioned, may be shifted crosswise of the travel of the carriage 21 by manipulating the cross-feed wheel 24 in the customary manner.

A wheel-dressing turret 27, adapted to be locked into various positions by its locking lever 27A, is selectively movable in known manner to present one or another of the dressing bits 27B for engagement with either of the grinding wheels 25A or 25E upon appropriate positioning of the latter for this purpose.

*Rockable workhead and chuck means*

Referring to Figs. 1 and 2, the workhead 29 includes the reciprocable chuck head 29A, its spindle means 29B, and gears 109—110, all disposed as a unit on a laterally rockable table 30, pivoting on studs 30A seated in posts 30B, which are fixed on the main carriage 21 in the manner depicted in Fig. 3. A tappet bolt 30C (Fig. 7, also) is adjustable to limit the amplitude of oscillation of the table. The pivotal axis of the table, through studs 30A, is concentric with the axis through the main drive shaft 28 for reasons to appear.

As depicted in Fig. 6, the chuck 29A is set up as a head stock with a live center 29C and a dead center in the tail stock 35 carried on a longitudinally shiftable block 36 releasably locked by handle 37. It is to be understood, however, that a jaw chuck is frequently substituted. The spindle member 29B is seen to include a sleeve 29D fixed thereon, but slidable in a short sleeve-bearing insert 111 at one end of the head, and in another short sleeve-bearing insert 29E at the opposite end of the head.

Surrounding the spindle sleeve 29D is a compression spring 29F expanded between the sleeve bearing 29E and a retaining ring 29G keyed into the main sleeve, and serving to thrust the entire chuck assembly including its spindle 29B and the gear 109 (adjustably secured to the sleeve by setscrew 29H), axially toward the right as a unit in the workhead, the spring 29F acting to return the chuck means to its normal position as viewed in Fig. 6. Moreover, the entire workhead assembly, including the aforesaid chuck means, is also laterally movable as a unit by reason of its being mounted on the rockable table 30.

*Table-rocking and chuck-reciprocating mechanism*

Means for concurrently rocking the table 30 and reciprocating the chuck members 29A, 29C, etc., includes a drum cam 80 (Figs. 1 and 3) journaled on a stud shaft bolted to the side of the workhead as at 81, said cam being driven from the main drive shaft 28 through cam gear 80X and spindle gear 110 by power derived from the main shaft 28 through the special differential screw system to be described hereinafter, it being understood for present purposes that the drum cam revolves continuously so long as the main drive shaft 28 is rotated by motor means 26.

Referring to Fig. 3, a cam-follower roller 82, journaled at the end of a toggle lever 83, rides the cam profile and accordingly reciprocates the toggle lever by its excursions in and out of the cam-pattern reliefs 80A; and at the same time, said follower also causes oscillation of a throw-lever 84, which has one of its ends pivotally conjoined with the toggle lever and the cam roller 82, while its opposite end is provided with a thrust roller 85 riding against the shoulder 109A of the chuck gear 109.

A fulcrum roller 86, carried by a slidably-adjustable block 86A, can be moved toward either of the rollers 82 or 85 to determine the amplitude of oscillation of the throw lever, it being merely necessary for this purpose to loosen the clamp plate 87 of the track structure in which the block 86A is seated.

Thus, as the roller 82 rides into and out of the cam formations 80A, the throw-lever 84 rocks against the roller 86 as a fulcrum and urges the thrust roller 85 against the shoulder of gear 109A, which is fast on the spindle 29B, and therefore rapidly reciprocates the chuck assembly in cooperation with the chuck-return spring 29F (Fig. 6).

As a result of the aforesaid reciprocation of the toggle lever 83 by the drum cam 80 and cam-follower roller 82 (Fig. 3), the thrust thereof is transmitted through a toggle block 91 to a rocker slide bar 93, a compression spring 92, and a lock-out means including a pair of over-center knuckle levers 88 and 89 (provided the knuckle is straightened into its operative over-center condition as by actuation of hand lever 90), thus causing reciprocation of said slide bar 93.

The rocker slide bar 93 (Fig. 1) passes beneath the rocking table 30 to a point about midway along the length thereof and has a depending part 98 (Fig. 10) to which is secured by set screw 98A a riser cam 94 which rides upon a relatively stationary carriage cam 95 adjustably secured by set screws 95A, 95B on a screw block 96 which is adapted to be shifted back and forth by a long screw 99 threadedly seated in a U-shaped block 97 and which is secured at desired positions by clamp screws 97A on the side of the carriage 21.

When the lock-out knuckles 88 and 89 are relaxed or jackknifed, the toggle lever 83 (Fig. 3) reciprocates idly, and no thrust is imparted through spring 92 to the rocker slide 93, so that the riser cam 94 (Fig. 1) is likewise idle, and no rocking of the table 30 will occur. Thus, the sidewise oscillation of the workhead is selectively controlled by the lever 90 and associated lock-out mechanism 88, 89, 91, 95, etc.

However, when the lock-out lever 90 is in over-center position to straighten out the lock-out knuckles and effectuate the toggle as aforesaid (Figs. 1 and 3), the rocker slide 93 will be reciprocated, and the riser cam 94 will ride back and forth on the slope of the carriage cam 95, thus causing the workhead table 30 to be rocked as one of the functions of the rotation of the drum cam 80, it being borne in mind that concurrently with such rocking of the workhead table 30, the chuck assembly is being simultaneously reciprocated by reason of the oscillation of the throw-lever 84, by the drum cam, and hence as another function of rotation of the drum cam; and this lateral rocking of the entire workhead, plus a concurrent linear or longitudinal reciprocation of the chuck means, occurs while the carriage 21 is advancing in its linear travel codirectionally with the aforesaid linear reciprocation of the chuck means and included drill blank or other work piece chucked therein.

Spiral feed mechanism

Referring again to the top view of the machine in Fig. 2, it will be observed that a short shaft 100 is disposed on the main carriage bed 21 and journaled in pillow blocks 100A; and, as seen sectionally in Fig. 5, this shaft 100 actually consists of two separable sections splined at 101B.

It is important to observe that each section of shaft 100 has a deep helical threading or worm which is reversely directed relative to the other, as at 101 and 102; moreover, the angular rate or lead of the worm 101 is pitched slower than that of the worm 102, the former having, in one embodiment, a 1½-inch left-hand lead, while the latter has a 2-inch right-hand lead.

Fixed to work upon the slow-pitch worm section 101 is a first ball-bearing nut 103, while a second ball-bearing nut 104 is similarly fixed to work upon the faster worm section 102, these worm nuts being of the recirculating-ball variety in which a plurality of bearing balls 103A travel in a portion of the helical threading 101 in shaft 100, as the latter turns and shifts longitudinally (since the nuts are fast with their respective pinions, which in turn are journaled on the carriage bed) to be recirculated through a return tube 103B. Except for differences in pitch and reversal of lead, the two ball nuts are identical, the nut 104 having bearing balls 104A recirculated through tube 104B exactly in the manner of the first nut.

The pillow blocks 100A are preferably fitted with ball bearings; and each ball nut has threaded through the appertaining bearing races a bushed pinion 105 or 106 (see also Fig. 4) anchoring the nuts rotatively in their respective bearing blocks, so that worm shaft 100 will, under certain conditions of loading to be explained, be obliged to shift axially or lengthwise responsive to turning efforts relative to the differential ball nuts 103, 104, while, conversely, the ball nuts will be obliged to turn in a certain differential relationship upon axial shifting of the worm shaft.

The two worm pinions 105 and 106 respectively mesh with drive pinions 107 and 108 on the main drive shaft 28 (as in Fig. 4); and, while the pinion 107 is free and floats on this shaft 28, pinion 108 is not free, but is fast and must rotate with the shaft.

Referring now to Fig. 6, showing details of the workhead, chuck spindle, and main drive shaft, it is important to observe that a large cam gear 110, floating on the chuck insert 111, meshes with the driving pinion 108, and is continually rotated by the latter independently of any motion whatever of the chuck spindle.

The aforesaid large cam idler gear 110 (Figs. 3 and 8) meshes with the gear teeth 80X on the drum cam 80 to impart to the latter the rotary motion necessary for reciprocating the workhead and concurrently effecting a rocking movement of the table 30 through the agency of the cam riser means 94—95, heretofore described, and is therefore also referred to as the compound-motion cam.

Differential loading and equalizing means

For purposes of explanation, the worm shaft and differential ball nuts are defined as constituting a differential worm or screw means; while the gear means including the worm pinions 105, 106, the spindle gear 109, the cam idler gear 110, and the drum cam gear 80X, together with the drive pinions 107, 108, constitute a differential interdrive means between the chuck and screw system.

Now, if the drive shaft 28 is regarded as one loading factor in the differential worm system, while the interdrive gearing is regarded as another such factor, the mutual interactions of the worm and gear means are such as to produce a planetary type of differential load reaction which under certain conditions results in a fugitive or excursive axial shifting of the worm shaft 100, on the one hand, and on the other hand, in a rotation of the chuck spindle at a speed which is determined by the direction and rate of axial excursion permitted or produced in the worm shaft, if any.

The worm shaft may be forcibly held against any axial shifting, or it may be permitted to shift as far as it can before being arrested by reaching the end of the helical thread; but, in either case, the shaft thereupon becomes (in effect) locked-in with the main drive shaft and the chuck, and both ball nuts must then rotate in step therewith, for all practical purposes as though they were positively keyed to the shaft.

Conversely, if the drive shaft 28 be assumed at rest, and if an appropriate axial thrust were applied to the worm shaft, the chuck would rotate in one or the other direction at a speed depending upon the direction and magnitude of the thrust, until the shaft could retreat no farther, it being important to note that the construction and operation of the device is such that this interdriving effect can be produced and utilized as an accelerating or decelerating force acting positively or negatively on the speed of the chuck spindle at the same time as the spindle is being driven by the main drive shaft.

Thus, if the drive shaft starts to rotate the chuck spindle will also begin to rotate, and at the same time the worm shaft will start to shift axially as far as it can in a certain direction. Upon being arrested in this latter shifting action the worm shaft and the two ball nuts rotate in step as though keyed together, and the chuck spindle rotates at whatever speed is determined by the speed of the main drive shaft 28. But in this latter state of operation, it is very important to note that the worm shaft may also be shifted axially back in the opposite direction from its initial excursion (as far as its helical threading will permit) and in so-doing will overdrive the chuck spindle and add to its speed.

Moreover, if the worm shaft should be suddenly retracted in the direction of its original excursion during the latter overdriving shift (or from any intermediate static position), the effect would be to subtract from the speed of the chuck spindle so long as such a retractive shift continues.

From the foregoing explanation, it will now appear that three critical loading factors normally act in the operation of the differential worm and interdrive system, namely: the driving torque applied by the chuck motor 26 through shaft 28; the chuck load (including the work load and loading effect of the several interdrive gears); and, finally, a regulating or equalizing axial thrust load which is to be deliberately applied to the worm shaft as a governing factor to determine the angular speed of the chuck spindle, and to instantly supply adjusting increments or decrements in such speed responsive to the slightest change in rate of travel of the main carriage.

It is the function of the equalizing or differential loading means to translate the linear travel of the main carriage into a regulated axial thrust on the worm shaft of such magnitude and direction as will accelerate (or decelerate) the chuck by an amount which always bears a predetermined fixed relation to the rate of advance of the carriage.

Stated otherwise, the equalizing means converts the carriage travel into a differential loading and regulating factor which is to be applied as aforesaid to the worm system as an axial thrust load (which may be neutral, positive, or negative in effect, depending upon whether the carriage speed is relatively constant, increasing or decreasing), and which therefore may be said to apply a constant-speed regulating load to the differential screw and interdrive system for the purpose of holding the chuck speed precisely in step with the carriage advance.

Means for axially loading the worm shaft 100, as a function of the travel of the carriage 21, includes a disjoined or impositive equalizing leverage system which travels with the carriage and has a connection with the worm shaft, together with a feeler means adapted to engage a stationary fulcrum as a result of the travel of the carriage, whereby an axial thrust is applied to the worm shaft which is a function of the travel of the carriage, this equalizing leverage system being adjustable to predetermine the ratio of the applied thrust load to the rate of advance of the carriage, in order that spiral leads of different angular value may be selected.

Referring to Fig. 1, the equalizing system includes a stationary, T-shaped fulcrum member 40 adjustably mounted on the apron 20A of the machine base, together with an equalizing or loading rocker means including a heavy cast plate 50 pivotally mounted on the carriage and having a pendant feeler arm 53 in alignment with the fulcrum member 40 to bear against the latter (as in dotted lines) responsive to forward travel of the carriage, with the result that the rocker plate 50 will be pivoted in a clockwise sense, such motion being transmitted as an axial thrust into the worm shaft by reason of the provision of a pair of spools 71 and 72 thereon (Fig. 9) coacting with a spool roller 70 on plate 50.

Referring to Fig. 11, the equalizing rocker plate 50 is a heavy, counter-balanced, casting swung on removable pivot studs 51 seated in selected pairs of fulcrum holes 51A located along the length of each of a pair of trunnion arms 52 fixed on the main carriage (as at 52X, Fig. 9).

Not only can the stroke of the loading rocker 50 and its feeler lever 53 be adjusted by relocating the pivot studs 51, but the sense of the spiral lead may be changed from right- to left-hand by moving said studs upwardly past the center of spool roller 70.

Along one side of the plate casting 50, as indicated by dotted lines in Fig. 9, is a slide track 50D in which the upper open end portion of the bifurcated feeler arm 53 is adjustably seated and clamped by set screws (not seen) in said arm, so that the effective length of the feeler lever may be altered.

Slidable in the longitudinal slot part 53A (Fig. 9) of the bifurcated feeler lever, is a fulcrum roller 54 (Fig. 11) journaled on a slide block 55 interfitting with the slot 53A and provided with a knurled set-screw 56, loosening of which permits the roller means 54 to be selectively moved up and down to further change the effective length of the feeler lever, and thereby alter the loading stroke or rate imparted to the rocker plate 50 as the carriage advances and causes the roller 54 to bear against the edge of fulcrum bar 40.

A further selective adjustment of the loading stroke may be effected by moving the fulcrum bar 40 back and forth codirectionally of the movement of the carriage (Fig. 9), the head or cross arm 40A of the T-bar being provided with chamfered slots 40B to ride on lugs 41 and 42, the latter being provided with a knurled setting screw 43 for freeing or securing the fulcrum member in various positions of horizontal adjustment longitudinally of the carriage travel, as aforesaid.

Modified workhead with change gear unit

The modified workhead structure depicted in Fig. 12 differs mainly from the arrangement heretofore described in that there is provided a gearhead with changeable gears for the motion-compounding drum cam by which the workhead table is rocked and the work chuck is reciprocated, the construction of the workhead 29X, itself, and the associated chuck and spindle means 29AX, 29BX, as well as the workhead table 30X, being substantially identical to that heretofore described in view of Figs. 3, 6, and 7.

Referring to Fig. 12, the modified drum cam 180 is carried on a stub spindle 182 which is seated in a bracket 181 bolted as at 181A on the side of the workhead 29X.

Removably secured on the cam shaft 182, by nut 183, is a small cam gear 180X, which meshes with an intermediate cam gear 184, adjustably seated on a gear clamp plate 186 by means of a stud-bolt spindle 185, the foregoing cam-gear arrangement being shown to advantage also in Fig. 14, from which it will appear that the gear 110X in this modified arrangement now meshes with the intermediate gear 184, instead of directly with the cam gear, as in the embodiment of Fig. 3.

The gear clamp plate 186 (as viewed in Figs. 17 and 18) is lifted over the workhead sleeve and secured at the required angle by setting the clamp bolt 186A to draw the split clamp jaws 186B together. Two chamfered, elongated slots 187, 188 are provided in the plate to receive stud-bolt shafts like shaft 185 to dispose various sizes of intermediate gears, such as the gear 184, in operative relation to the spindle gear 110X and the cam gear 180X, different cams and gear sets of appropriate ratio being supplied for different grinding patterns to modify the timing for the motion-compounding cam means 180 and its associated table-rocking and chuck-reciprocating mechanisms.

Automatic selective lock-out

As depicted in Fig. 13, the table-rocking means is modified to coact with the modified interdrive cam means 180 and a modified lock-out system which can be adjusted to operate automatically and effect a selective rocking of the table 30X during each cycle of the grinding pattern.

The table 30X is substantially identical to the previously described table means 30. However, the toggle lock-out mechanism 88 —90 associated with the latter is replaced by a slide mechanism including a driven slide bar 190 (Fig. 13) seated for reciprocation upon a grooved portion 30XY of the table in which is confined a heavy return spring 191 adapted to thrust against a modified riser cam 94X, bolted to the slide bar as at 194 to project downwardly for engagement with the carriage cam 95X, the latter being adjustably mounted on the main carriage 21X by means of a long screw 95BX threadedly seated in a U-bracket 95CX.

The slide-return spring 191 urges the slide bar and riser cam toward the right into a normal position.

A second or driving slide bar 200 is superimposed upon the first or driven slide bar 190, and has a depending pin 201 acted upon by a return compression spring 202, seated in a slot in this second slide and serving to return the second or driving slide toward the right. The assembly of slide bars is held in position by a pair of angles 196, 197 (Fig. 12).

A cam roller 203 is mounted upon the second slide by stud 203A in a position to engage the cam profile of the compounding cam 180, the latter thus serving to reciprocate the second or driving slide 200 cooperably with spring 202.

At the left-hand extremity of the driven slide 190 is an offset end-thrust block 190A (see also Figs. 14 and 15) upon which is pivoted a lock-out hand lever 90X, it being especially noted in Fig. 13 that the left-hand end of the driving slide 200 falls short of the end block 190A on the first slide, so that a gap exists between these parts which is bridged by a coupling and lock-out plug 205, in order to transmit the thrust of the driving slide 200 to the driven slide 190 when the lock-out is closed.

Referring to Fig. 15, the lock-out plug 205 is bolted to a dog-leg trip lever 206, pivoted as at 207 on the slide end-block 190A, and has a depending leg 206A adapted to lie in the path of selector pins 210 slidably seated in a flanged member 211 fixed on a short shaft 212 journaled in a pair of pillow blocks 213 on the carriage 21X. The shaft 212 is provided with a pinion 214 (Fig. 14) which meshes with a pinion section 215 on the main drive shaft 28X by means of which the pin-carrying rotary member 211 rotates at a certain rate to turn the selector pins 210 cyclically against the dog-leg lever 206A (Fig. 15) to rock the lock-out lever into the partially tripped condition shown in dotted lines, which results in sufficient withdrawal of the coupling or lock-out plug 205 from in between the coupling parts at the ends of the two reciprocable slides 190 and 200 (Fig. 13) with the result that the lock-out automatically tripped out a number of times for each cycle of revolution of the pin-carrier 211 depending upon how many tripping pins 210 are carried thereby and are extended into tripping position.

Not only does the lock-out trip-out momentarily when any selector pin 210 engages the dog leg 206A, but the construction of the lock-out dog means is such that it will automatically reset itself after each such partial tripping operation, by reason of the fact, as shown in Fig. 15, that there is an elongated overcenter slot 216 formed on the upper leg 206 of the lock-out dog lever, in which rides a spring-urged gliding pin 217 at the end of the lock-out lever 90X, so that whenever one of the selector pins bears against the dog leg, the spring-urged pin 217 will yield while the coupling block 205 is withdrawn far enough to decouple the slides; but, as soon as the pin has passed, the spring pin 217 will press the lever down again and restore the plug block 205 to coupling position.

However, when the lock-out lever 90X is fully pivoted into the position shown in Fig. 16, the spring pin means 217 then passes over-center of the pivot 207, and the lock-out dog remains in the fully tripped-out condition shown until manually reset to the operative position of Fig. 15.

In Fig. 14 only two selector pins 210 are shown, while in the pin carrier 211A of Fig. 16 four such pins are shown. Moreover, the selector pins 210 are respectively slidable into and out of effective position, as depicted in dotted lines in Fig. 14, so that, as between the illustrations of Figs. 15 and 16, from one to four selector pins may be slid into operative position for the purpose of tripping out the lock-out a corresponding number of times per revolution of the pin carrier 211, thus decoupling the two slides 190 and 200 a corresponding number of times with the effect of preventing the rocking of the workhead table 30X for reason now to appear.

*Modified table-oscillating mechanism*

In the variant table-rocking mechanism of Fig. 14, the throw lever 84X is pivoted as at 219 on a block 220 which is adjustably bolted, as at 222 (Fig. 12) on the side of the driven reciprocating slide 190, so that (as before) one end of the throw lever is reciprocated as one of the functions of the rotation of the drum cam 180, the opposite end of this lever being provided with a thrust roller 85X which rides against the collar of the spindle gear 109, while the intermediate span of the throw lever rocks against a fulcrum roller 86X carried on the adjustably slidable block 86AX, as in the embodiment of Fig. 3.

Thus, as the driven slide 190 is reciprocated by the driving slide 200 (when the lock-out coupling plug means 205 is set) the chuck spindle 29BX (and hence the chuck head) is reciprocated concurrently with the rocking of the table 30X by the cam-riser means 94X—95X, it being noted here that the two latter riser-cams have their working edges serrated to provide a multitude of small gliding surfaces thereby reducing friction for the faster reciprocatory displacements, and short, steep rises which they are intended to provide for full rdial relief work, as distinguished from the constant-rise cams 94—95 of Fig. 10, which latter are used for longitudinal relieving where lands of different thickness are required, and the relief is circular instead of radial.

*Summary of operation*

The elementary operation of the differential spiral screw system, with its interdrive, and compound actuating means for the chuck head, as well as the selective lock-out, are all described in view of the purely schematic layout shown in Fig. 19, which includes parts of both forms of the workhead and lock-out means disclosed in Figs. 10, 11 and 12 to 18.

Assuming that the motor 26 is started and the main shaft 28 first begins to rotate, and also that a drill blank in the form of a two-step drill 25X is chucked up between the head stock center 29C and the tail stock 35 and that suiable adjustments have been made for the purpose of grinding a radial relief along the helical lips of a two-fluted drill, the first thing to happen as the motor 26 is started will be an axial shift of the worm shaft 100 toward the left, as far as it can go, because of the existence of the difference in both pitch and lead between the two ball nuts 103, 104, and the further fact that the nut 104 cannot shift and is being positively driven from shaft 28 through drive pinion 108.

Now during this axial excursion or shift of the worm shaft 100, the ball nut 103 is rotated, as is its pinion 105, which drives the idler pinion 107 and hence the main chuck spindle 29B, to rotate the chuck head 29A, the dogging pin 33 of which carries the chuck dog 34 around to rotate the drill blank 25X in the stocks.

The limit to which the worm shaft 100 will escape, as aforesaid, will be determined by the rocking limit permitted the equalizer rocker plate 50, since the latter is coupled positively to the worm shaft through the two spools 71, 72, thereon, and the plate roller 70.

If it now be assumed that the main traverse carriage 21 is started (as by turning the lead-screw control 22) so that it travels slowly toward the right, it will be apparent that the fulcrum roller 54 on feeler arm 53 attached to the rocker plate 50 will be moved into engagement with the T-bar fulcrum member 40, thus pivoting the rocker plate 50 in the reverse direction, from its movement when the worm shaft initially shifted toward the left, so that now the rocker plate through spool roller 70 exerts a reverse loading thrust on the worm shaft 100 with the result that the ball nut 103 is additionally driven (i. e. overdriven) in the same direction in which it is being motor-driven by the pinions 106, 108. In other words, the worm shaft is now being accelerated relative to its normal motor speed, and, of course, this increment of speed is communicated directly to the chuck spindle from pinion 105 through the idler pinion 107 to the chuck gear 109.

Now, since the rate of advance of the carriage is substantially constant between known practical limits, and, since the rate of the main drive shaft 28 is likewise constant between known practical limits, and since the accelerating increment provided by the equalizing system is constant between considerably closer limits (by reason of the absolute dependent rates of the rocker means and over-driven worm nuts), the resultant speed of the chuck is very precisely related to the rate of advance of the carriage, and the slightest change in the carriage rate (plus or minus) will instantly be reflected through the equalizing leverages to modify the axial loading on the worm shaft accordingly, with the appropriate alteration of chuck speed.

Adjustments of the fulcrum bar 40, the fulcrum roller 54 on the feeler arm; the effective length of the feeler arm (at its attachment to the rocker plate) and the location of the pivot inserts for the rocker plate, all provide for a wide selection of spiral leads, as represented by the rate of linear advance of the carriage 21 with respect to the angular speed of the chuck means 29A, etc., and a stationary point such as the grinding wheel 25A.

Thus, one of the desired resultant motions, the spiral displacement of the drill blank 25X, is achieved by compounding the angular speed of the chuck and the linear advance of the chuck (with the carriage) with a high degree of precision, by reason of the differential loading action of the carriage itself on the screw and interdrive system.

The two remaining compound-motion actions required in this example, namely: reciprocation of the chuck and lateral rocking thereof, are also provided as functions of the rate of the worm shaft in the following manner.

The worm pinion 106 drives a large idler gear 110 floating on the workhead assembly; and this gear in turn drives the cam gear 180X on the drum cam 180, rotating the latter so as to reciprocate the rocker slide 200 through its cam roller 203.

The lock-out handle 90X being down in operative position, the lock-out coupling block 205 is interposed to bridge the idle-stroke gap between the end parts of the two slides 190 and 200, so that slide 200 drives slide 190, as a result of which the chuck throw lever 84X pivoted on slide 190 at 219 rocks against the adjustable fulcrum roller 86X to force the thrust roller 85X against the spindle gear 109 and displace the spindle and chuck means 29A, 29B a short amount toward the right, the spindle return spring 29F restoring the spindle and chuck means back to normal position when the thrust of the throw lever is again relaxed.

Thus, a short reciprocatory displacement is imparted to the drill blank 25X while it is being simultaneously spirally advanced relative to the grinding wheel 25A, which we can assume has been moved crosswise of the carriage bed into grinding position by manipulation of the cross-feed wheel 24.

The remaining compound-motion component is also derived from the drum cam 180 as a further result of the reciprocation of slide 190 in moving the riser cam 94X over the carriage cam 95X, which rocks the workhead table 30X at its pivots 30AX, thereby momentarily thrusting the drill blank against the grinding wheel 25A.

As pointed out in the detailed specification, the rocking axis of the workhead table 30 through pivots 30AX is concentric with the axis through the main drive shaft 28 (considering Figs. 3, 7, and 8 together with reference to parts 28 and 30A), so that it will be understood that the rocking of the table 30 or 30X is planetary relative to the drive shaft 28. Moreover, the slight amplitude of reciprocation of the chuck spindle does not affect the mesh of the gears 107, 109, the width of which permits the necessary sliding as the spindle moves in and out.

Thus, the compound motion achieved creates a spiral advance of the drill flute relative to the grinding wheel faithfully following the helical lead of the drill.

Moreover, in the brief interval during which the drill flute is rocked into contact with the grinding wheel, it must be borne in mind that the drill is being advanced lengthwise a slight amount and therefore the chuck spindle is advanced a corresponding amount, but is quickly retracted for the next lateral pass at the grinder.

The different step-levels of the drill blank 25X (if any) are treated in succession by properly positioning the grinding wheel through use of the cross-feed adjustment.

Use of the chuck dog 34 makes it possible to start the drill blank on any flute or at any angular position with absolute precision by setting the dog or the dog pin at the required starting position.

Moreover, the automatic selective lock-nut means permits selecting which flutes are to be ground.

Referring still to Fig. 19, if any of the selector pins 210 is moved into operative position so as to strike the lock-out dog leg 206A, the lock-out coupling block 205 will be momentarily lifted to prevent rocking of the workhead table 30X at that instant, whereupon the coupling block 205 will be restored to effectuate a rocking of the table in the interim until the next contact of a pin 210 with the dog.

The novel spiral feed mechanism derives its great utility and efficiency from the rugged but simple character of its planetary type differential interdriving action on the chuck, and the fact that while the carriage determines the magnitude and sense of the differential loading applied axially to the worm shaft, the carriage itself is nevertheless not subjected to any appreciable loading by the equalizing means.

As previously alluded to, the action of the disclosed screw system derives from the fugitive character of the worm-shaft excursions occasioned by gearing or coupling the chuck means to one of the nuts; and in this sense the entire chuck system is the work load—whether any grinding is being done or not; in other words, the chuck spindle and head, either in stand-by condition (no grinding) or with grinding in progress, is regarded as a "work load" on the output side of the worm system; and there is also the driving load on the input side of the system, as well as the differential load on the axial-shifting side of the system.

The torque load overbalances the work load and causes the worm shaft to creep or shift in escape until it is stopped or returned. When it is stopped, by applied extraneous force, the loading may be said to be equalized or balanced, and the system can operate indefinitely in this condition to all practical purposes as though the two worm nuts or their pinions were keyed fast with the shaft.

In fact, if the two worm nuts were of identical (but reversed) pitch, the effect would be the same, and there could never be any axial shifting of the worm shaft; but with differentially threaded nuts, the nut with the faster pitch (e. g. 2" lead) is harder to turn than the slower nut (e. g. 1.5" lead), so the latter (in a manner of speaking) "slips" under the applied work load (both stand-by and working) and begins to rotate out of step with the speed of the worm shaft and to pull the worm shaft through as long as the latter is free to escape.

When the escaping or creeping worm shaft reaches the end of its helix, the axial shift of course is stopped, and the two nuts again behave as though keyed fast with it.

The reverse action, namely forcibly thrusting the worm shaft back in the direction opposite to its fugitive shifting, will produce the reverse effect, namely, a driving of this same (slow-pitch) nut which previously caused the worm shaft to shift in the forward or fugitive direction; and in this sense, said nut is now overdriven, and if the reverse thrust is great enough the worm shaft can be speeded up over and above its rate caused by the torque shaft (since both nuts are rotating conjointly with the shaft already), at least until the axial travel of the worm shaft is stopped one way or another.

Thus, if the applied control or equalizing axial loading on the worm shaft is just sufficient at all times to prevent axial excursion thereof in either direction, the speed of the chuck will be the same as the speed of the power or torque shaft; but axial escape in one direction, under its own differential thrust, will apply a negative or speed-reducing factor to the chuck means for the duration of such escape motion, while forced axial shifting in the reverse direction would cause an overdriving or positive speed-up of the chuck means over and above the rate normally determined by the driving motor 26.

Thus, the overdriving effect is positive and supplies an incremental speed factor to the chuck means, while the underdriving effect is negative and applies a decremental or slowing factor to the chuck system; and lastly, the static or immovable axial condition of the worm shaft is designated, for convenience, as the condition of neutral or equalized counter-loading, having no other effect upon the angular speed of the worm shaft than to key-it-in to rotate absolutely in step with the power drive shaft.

It will now be apparent that the equalizing means, including the rocker member 50, feeler lever 53, and adjustable T-bar fulcrum 40, is in effect a regulatory loading means with selective-ratio adjustment of the leverages involved, and in which the feeler lever in thrust in one direction by its positive connection through spool means 70, 71, 72 with the worm shaft, and in the opposite direction by its impositive feeler "connection" with the carriage, whereby to load the worm shaft axially by an amount determined precisely by the rate of travel of the carriage, since this latter travel is actually the force which is causing the equalizing rocker to counter-thrust against the worm shaft thrust at the selected ratio.

Since the compound-motion mechanisms are also positively driven (as by cams 80 or 180 etc.) from the differentially-regulated worm shaft, the oscillatory rocking of the work table and the reciprocation of the chuck means are controlled with the same degree of accuracy as the spiral lead; and it is possible to change gears on the gear head embodiment of Figs. 14 and 17, and also to change the cam 180 (or the cam 80) as desired, without concern about disturbing the timing accuracy.

In this latter connection, it is pointed out that in the embodiment of Fig. 3 (having no gear-changing head) the cam 80 would ordinarily be a four-lobed cam for a four-fluted drill, since gears 80X and 110 are of 1:1 ratio; but in the gear-head embodiment of Fig. 14, the cam may be two-lobed and driven at a 2:1 gear ratio for the same purpose, and the gearing and cams may be easily changed to provide a further extended range of selections, whereas in the embodiment of Fig. 3 the selections are limited to the cam 80 itself, so far as frequency of oscillation of the table 30 is concerned.

The flexibility and accuracy of both embodiments of the machine is made possible by the novel differential screw system, and would not be possible with a system employing differential gears alone, without the screw system, because of friction, the inherently cumulative inaccuracies of the gears themselves and practical obstacles in supplying effective regulating equipment to counteract such inaccuracies even with relatively coarse tolerances in the finished work.

In the latter connection, the ball-bearing nuts 103, 104 minimize friction in the differential part of the system and work in a screw helix which, itself, can be machined with great accuracy, and suffers no troublesome wear from the travel of the bearing balls therein, ordinary wear elsewhere in the system being in some measure automatically compensated by the self-regulatory peculiarities of the differential screw means itself. However, while ball-bearing nuts have been specifically described and are recommended for best results, other forms of appropriately pitched nuts or like translatory screw and keying means can be substituted for the ball nuts to work with the differential screw shaft means and realize the remaining benefits of the novel differential interdrive system.

I claim:

1. A speed-regulating differential worm screw drive including a spindle rotated by gear means and driven from reversely and differentially pitched worm-following means coacting with an axially-shiftable, reversely, and differentially-pitched worm shaft; equalizing means for shifting said shaft in opposite directions, or holding the shaft fast; interdrive means operatively interconnecting said worm-follower means with said spindle means; and means for actuating said equalizing means to apply reverse or neutral axial loading factors to said shaft to modify or hold steady the spindle speed dependently upon the magnitude and sense of the applied loading factor.

2. In a spiral feed mechanism, the combination with a linearly advanced work carriage, a rotatable chuck and a motor-driven drive shaft for the chuck, of spiral feed mechanism including a differential screw shaft having a pair of cooperating differential nuts thereon, and pitched to permit axial shifting of said screw shaft, one of which nuts drives said chuck and the other of which nuts is driven by said drive shaft, together with loading means translating the linear advance of the carriage into an axial thrust and applying same to said screw shaft to regulate the angular speed of said chuck, by angular displacements of the first nut produced by axial displacement of said screw shaft.

3. A differential screw system including a driven shaft; a driving shaft; a worm shaft having reversely-directed and differently pitched worm sections; a matching worm nut coacting with each said section and mounted in axially fixed position for rotation therewith; the pitch of each worm helix being of a degree to permit axial shifting of said worm shaft in said nuts; means drivingly interconnecting said driving shaft with a first one of said nuts whereby to drive said worm shaft through the first nut; means drivingly interconnecting said driven shaft with a second one of said nuts whereby to drive said driven shaft through the second nut; and means for axially shifting said worm shaft to accelerate or decelerate the angular speed of the driven shaft imparted by said driving shaft.

4. A differential screw mechanism comprising screw-shaft means having at least two runs of threading each of different pitch and direction of lead from the other; a matching nut mounted in fixed position to work on each run of threading, each nut including pinion means rotatable therewith; a power shaft and pinion means therefor driving the pinion means of a first one of said nuts; a driven load shaft and pinion means therefor drivingly engaged with the pinion means of the second nut; the pitch of said threading being sufficiently fast to permit axial shifting of said screw-shaft means in said nuts; and control mechanism for applying a regulating action axially of said screw shaft means to cause or prevent axial shifting of the latter for the purpose of increasing or decreasing or maintaining the angular speed of the second nut at a predetermined value relative to the speed thereof determined by said power shaft, whereby to regulate the speed of said load shaft.

5. A differential screw drive for machine tools and the like and comprising, in combination: a power shaft; a driven work shaft; differential shaft means including two reversely-directed and differentially pitched runs of worm helix; matching nut means working on each worm helix and respectively fixed in position to rotate concentrically of the differential shaft means; means drivingly coupling a first said nut means with said power shaft for rotation by the latter; means drivingly coupling the second said nut means with said work shaft to rotate the latter, the pitch of said helices being sufficiently fast to permit axial shifting of said differential shaft means in said nut means to impart differential angular motion thereto; and equalizing means including an adjustable lever system and a linearly movable member drivingly connected therewith for applying an axial shifting force to said differential shaft means in a predetermined range of ratios to the rate of linear movement of said last-mentioned movable member, whereby to selectively correlate the angular speed of said work shaft with the linear rate of said last-mentioned movable member.

6. In combination, a linearly traveling carriage; a rotatable chuck on the carriage; a motor-driven drive shaft for the chuck; and means providing a differential interdrive between said drive shaft and chuck and comprising a differential screw system including a differential screw shaft; a first differential nut driving said screw shaft from said drive shaft; a second differential nut driving said chuck from said screw shaft; and equalizing means moved at selective predetermined rates by said carriage to exert a loading thrust axially upon said screw shaft for applying a differential acceleration factor to the angular speed of the chuck.

7. In a grinding machine, in combination, a linearly traveling work carriage; rotatable chuck means on the carriage; a motor for driving the chuck means; a drive shaft for the chuck means driven by said motor; axially-shiftable differentially-pitched and reversed screw means and gear interdrive mechanism operatively intercoupling said drive shaft and said chuck means to rotate the latter from the shaft; and means for translating linear travel of said carriage into a thrust loading applied axially to said differential screw means to produce a resultant angular speed in the chuck means which is accurately coordinated with the rate of linear travel of the carriage.

8. In a machine tool of the type having a linearly travelling work carriage, a rotatable chuck means on the carriage, and a motor and drive shaft therefor travelling with the carriage for driving the chuck means, improvements in spiral-lead controls comprising, to wit: a differential worm and gear mechanism drivingly intercoupling said shaft and chuck means and including a worm shaft adapted to be shifted axially to overdrive said chuck means through gear and differential nut means coacting with said worm shaft; together with differential loading means including a leverage operatively interposed between said carriage and worm shaft for applying an axial effort to said worm shaft in predetermined ratio to the rate of travel of the carriage, whereby to produce an overdriving acceleration which is positive, negative, or neutral, depending upon the speed of travel of the carriage and whether the latter is at rest, gaining, losing, or holding steady its rate, whereby the resultant angular speed of the chuck is determined by the rate of linear travel of the carriage.

9. In a grinding machine, in combination with a linearly-travelling work carriage, a work chuck on the carriage; a power drive shaft on the carriage; a pair of coaxially aligned worm shafts and means interconnecting the same for joint shifting and rotational motion, said worm shafts having relatively reversed helical threading of different pitch; a pair of rotary worm nuts each fixed on the carriage for rotation to work on one of said worm shafts, joint shifting of said shafts effecting differential rotary movement of said nuts; interdrive gear means coupling one of said nuts with said drive shaft for rotation by the latter, said gear means also coupling the other said nut with said chuck for rotation of the latter by said other nut; said first nut jointly rotating the worm shafts from said drive shaft, and said second nut rotating said chuck as a function of rotation of the worm shafts; the differential pitch relation between said nuts causing said worm shafts to shift axially in a certain direction to a predetermined limit of axial displacement permitted same, responsive to application of driving torque thereto, whereupon said nuts are in effect substantially keyed-in with said worm shafts; reverse axial displacement of said worm shafts in a direction opposite to said certain direction effecting an overdriving of said chuck through said interdrive gear means in proportion to the magnitude of reverse displacement to speed up the chuck; and equalizing means for translating the advance of said carriage into an axial loading force applied to said worm shafts proportionately to the rate of advance of the carriage to determine the angular speed of said chuck.

10. In a grinding machine, a linearly travelling carriage; a rockable table on said carriage; a rotatable chuck and means mounting same for longitudinal reciprocation on said table; a power-driven drive shaft for said chuck on said carriage; a differential worm system on said carriage and including a pair of differentially and reversely pitched worm nuts and a differentially and reversely pitched worm shaft matching said nuts and slidable axially through said nuts to produce differential rotation of the same; means rotatively mounting said nuts on said carriage to work on the worm shaft as aforesaid; means drivingly coupling one of said nuts with said drive shaft for rotation by the latter; means drivingly coupling said chuck to the other nut for rotation by the latter, said nuts rotating jointly in step with said worm shaft when the latter is held against axial displacement relative thereto, and said worm shaft being operative to overdrive or underdrive said chuck responsive to axial displacement in opposite directions to augment or detract from the angular speed of the chuck imparted by said drive shaft; equalizing means including a leverage with a feeler following the movement of the carriage for axially loading said worm shaft in predetermined proportion to the rate of linear travel of the carriage to correlate the speed of the chuck to the speed of the carriage; and compound-motion means on the carriage including a rotary member driven from said worm shaft, a reciprocating member driven by said rotary member and carried on said table; a riser cam reciprocated by said reciprocating member and working on a complementary cam on said carriage to rock the table as a function of reciprocation of said reciprocating member; and means including a throw-lever oscillated by said rotary member for moving the chuck longitudinally in one direction, together with spring means acting on the chuck to return same in the opposite direction.

11. In machine tools having a linear travelling work carriage, a rockable table mounted on said carriage; a rotatable and reciprocable chuck mounted on said table; spring means normalizing the reciprocable displacement of the chuck; coacting riser cam means on the carriage and said reciprocatory member for rocking the table responsive to actuation of the reciprocatory member and said spring means; a power drive for said chuck; a differential screw system on said carriage and including a worm shaft having differentially and reversely pitched worm sections each provided with a matching worm nut threadedly coacting therewith and fixed in position for rotation with said shaft; a first one of said nuts being driven by said power drive, and the other nut being coupled with said chuck to drive the latter; the pitch of said worm sections and nuts being fast enough to permit axial shifting of the worm shaft in the nuts to produce differential rotation of the nuts, and vice versa, the worm shaft tending to shift axially in a forward direction responsive to driving torque from said power drive and loading thereof by said chuck in a certain sense of rotation of the first nut, and thereby tending to subtract from the speed of the second nut during such forward axial shifting, and to add to the speed of the chuck during reversely-directed axial shifting, said nuts being effectively keyed with said worm shaft whenever the latter is axially static and unable to shift; equalizing means including lever and feeler mechanism interposed between the carriage and a stationary fulcrum for axially loading said worm shaft to shift the latter axially in said reverse direction responsive to forward travel of the carriage and augment the chuck speed by a predetermined amount exactly proportioned to the rate of travel of the carriage; and compound-motion mechanism including said first-mentioned reciprocatory member, a throw-lever for reciprocating the chuck, and cam means driven by said worm shaft for actuating said reciprocator member and throw-lever to rock the table and reciprocate said chuck concurrently with rotation thereof during linear travel of the carriage.

12. In machine tools, the combination, with a linearly traveling work carriage having a rotatable work chuck thereon, of a differential screw system for driving said chuck and comprising: a worm shaft having reversely directed and differently pitched worm sections, each with a matching nut fixed to rotate concentrically of the corresponding worm section, said shaft being axially shiftable in said nuts, and such shifting action tending to rotate the nuts differentially at rates depending upon their pitch and lead; gear means drivingly interconnecting a first one of said nuts with said chuck; a power drive shaft for the chuck and gear means drivingly interconnecting the same with the second nut; said chuck means constituting a differential load acting on said worm shaft through said first nut and causing the worm shaft to shift axially in a certain direction responsive to application of driving torque to the second nut from said drive shaft to produce an effective negative or slowing turning effort on the chuck for the duration of such axial shift, said shaft becoming substantially locked-in with said nuts upon reaching the limit of permitted axial shift in the certain direction aforesaid, so that the shaft, nuts and chuck then tend to rotate in unison and also to rotate in unison when said worm shaft is held against shifting in any intermediate axial position; said shift being axially shiftable in the reverse direction to apply a positive or speed-increasing effort to said chuck; and load-equalizing mechanism coacting with said screw system and said carriage to transform the linear movement of the carriage into axially-directed efforts and apply same to said worm shaft for the purpose of axially loading and shifting the latter to impart effectively positive or negative angular speed components to the chuck responsive to the advance of the carriage and in proportion to the rate, and uniformity of the rate, of such carriage advance.

13. In a spiral grinding machine, the combination, with a linearly advanced work carriage having a rotatable chuck thereon and a power shaft for driving the chuck, of spiral-feed means comprising, to wit: a differentially-and-reversely-threaded screw shaft having a pair of differential nuts respectively rotatable on corresponding differential screw sections thereof and each fixed in position on said carriage for rotation with the screw shaft, the threading of said nuts and screw shaft being pitched such that the shaft is axially shiftable in said nuts to produce differential rotation thereof while concurrently driven by said drive shaft; a first one of said nuts driving said chuck and the other or second nut being driven by said drive shaft; together with means moved by said carriage in linear advance thereof for translating the linear advance of the carriage into an axial loading factor and applying same to said screw shaft to hold or shift the same and thereby regulate the angular speed of the first nut, and hence of the chuck, in predetermined coordination with the rate of advance of said carriage.

14. In a machine tool, a travelling carriage; a rotatable workhead on the carriage; drive means for rotating the workhead; a gear train drivingly intercoupling said drive means and workhead and including an axially shiftable and rotatable member and at least two gears differentially coupling the same with other gear means in said train, said two gears and axially shiftable member being differentially keyed together by reversely and differentially pitched helical keying means the lead of which permits either of said gears by rotation to shift the axially shiftable member and also permits the latter to turn either or both of said gears depending upon the differential loading effect thereof; together with adjustable means for transmitting axial force at desired ratios to and from said shiftable member and the carriage whereby to cause or prevent axial shifting thereof depending upon the relative rates of motion of the carriage and the workhead to hold steady, speed-up or slow-down the latter responsive to variations in speed of either the carriage or workhead from a desired predetermined relative rate.

15. Differential mechanism including a driving shaft and a driven shaft; differential shaft means having reverse helically evolved formations of different pitch; first and second gear means each respectively mounted in fixed positions to rotate concentrically of said differential shaft means and one of the helical formations thereon; means respectively keying said first and second gear means with the appertaining helical formation on said shaft means, the lead angles being such as permit angular driving of the differential shaft means by rotation of either gear, and linear shifting of the differential shaft means relative to said gears to rotate the latter at the same or different rates depending upon the existing loads thereon and the direction and magnitude of axial thrust loading on said shaft means; and additional gear means completing a driving interconnection through said first and second gears between said driving and driven shafts; together with means for transmitting axial thrust to and from said differential shaft means and a desired instrumentality.

16. In a machine tool of the class described, a rotatable work spindle and motor drive means therefor; a train of gears drivingly interconnecting said drive means and spindle; two particular gears in said train being in axially fixed locations and having joint rotatable, coaxially-aligned shaft means shiftable axially back and forth concentrically thereof with each said gear drivingly keyed to said shaft means by respectively reverse, helically-evolved key means interacting between the gears and shaft means and of respectively different pitch for each of said particular gears, the different pitches of said key means being determined to permit exertion of axial shifting force upon said shaft by either of said particular gears responsive to rotation thereof, with responsive axial shifting of the shaft if free to shift, or rotation thereof if free to rotate but not free to shift, as well as to permit rotation of said particular gears by axial shifting of the shaft, whereby said shaft may be rotated or shifted depending upon the magnitude and direction of angular and linear forces respectively acting upon said gears and shaft means; and loading means for additionally applying and resisting axial displacement forces in relation to shifting operations of the shaft means as aforesaid.

17. In a differential drive mechanism, shaft means having first and second helical formations thereon of respectively opposite rotational lead and different pitch; corresponding first and second rotatable gear devices coaxially mounted on said shaft means and each held against axial movement and respectively associated with the corresponding first or second helical formation as aforesaid, each gear device having complementary helical means for drivingly interkeying the same cooperatively with the appertaining helical formations on said shaft means, the pitch being fast enough to permit said shaft means to shift in a positive sense axially through said first and second gear devices responsive to axial thrust force applied thereto, or in a negative sense in response to rotative force thereon from either of said gear devices turned alone or at differential rates relatively; means for drivingly rotating one of the said gear devices; driven means constituting at least part of a work load driven by the second and remaining one of said gear devices; and thrust-loading means for resisting negative shifting forces from, or applying positive shifting force to, said shaft means.

18. In a spiral grinding machine having a rotated work spindle adapted to be reciprocated relative to grinding means, reciprocating and selective lockout means comprising a cam; cam riding means and a cam lever moved back and forth thereby in timed relation to rotation of said spindle; a throw lever oscillated by said cam lever and acting to thrust said spindle in one direction; spring means for returning said spindle in the opposite direction; a lockout lever and coupling means actuated thereby to intercouple said cam lever and throw lever when the lockout lever is in one position, and to uncouple the same when the lockout lever is in another position to interrupt reciprocation of the spindle; a rotary selector member having a plurality of tripping pins thereon movable into and out of tripping position relative to said lockout lever, said selector member being rotated in timed relation to rotation of said spindle; the number and angular location of tripping pins on said selector member corresponding to the number and location of flutes on the work piece, and those pins which are disposed in tripping position acting to engage and trip out the lockout lever from coupling position as said selector member rotates in step with the work piece, whereby reciprocation of the spindle may be interrupted for any desired flute or angular position of said work piece.

19. In a machine tool, the combination, with a traveling carriage, a rotary chuck-spindle means, and a drive shaft for rotating same, of: a differential interdrive mechanism drivingly connecting the rotary effort of said shaft to said chuck spindle means; said interdrive mechanism including a differential drive with translatory shaft means which is differentially coupled by reversely and differentially pitched helical keying means and cooperative gear means and which is axially shiftable in opposite directions to add to, subtract from, or hold steady the driving speed of said spindle means depending upon the direction in which said shaft means is axially shifted, or not permitted to shift; and differential loading and equalizing means operatively interposed between said shaft and said carriage and acting to impart to said shaft means an axial loading which is positive, negative, or neutral, in accordance with effective changes in rate of travel of the carriage, whether losing, gaining, or holding steady the speed, whereby to provide a compensation, increase, decrease in speed, or hold steady the resultant speed of said chuck spindle means in predetermined relation to the rate of travel of said carriage.

20. A differential drive mechanism comprising: a differential shaft having differently pitched helical drive formations thereon with opposite leads, a matching nut means cooperable with each said formation; means mounting each said nut means for rotative coaction with its appertaining helical formation but preventing substantial axial movement of said nut means; an output shaft rotatively driven from a first said nut means; a driving shaft cooperable with the second said nut means to rotate the latter; said differential shaft being axially shiftable relative to both nut means to exert a rotative effort on the latter in the respective directions and at the rates corresponding to the lead and pitch of the appertaining helical formations; and means for imparting force acting axially in either of two directions upon said differential shaft to modify the movement of the driven shaft by the driving shaft in accordance with the direction and magnitude of action of said axially imparted force.

References Cited in the file of this patent

UNITED STATES PATENTS

| | | |
|---|---|---|
| 1,413,982 | Gill | Apr. 25, 1922 |
| 2,092,563 | Tucker | Sept. 7, 1937 |
| 2,330,921 | Rickenmann | Oct. 5, 1943 |
| 2,479,281 | Umbdenstock | Aug. 16, 1949 |